(12) United States Patent
Fujino et al.

(10) Patent No.: US 7,745,042 B2
(45) Date of Patent: Jun. 29, 2010

(54) LITHIUM ION SECONDARY BATTERY (75) Inventors: Akiko Fujino, Suita (JP); Tsumoru Ohata, Kyoto (JP); Tetsuya Hayashi, Kadoma (JP)

(73) Assignee: Panasonic Corporation, Osaka (JP)

( * ) Notice: Subject to any disclaimer, the term of this patent is extended or adjusted under 35 U.S.C. 154(b) by 1095 days.

(21) Appl. No.: 10/577,494

(22) PCT Filed: Dec. 28, 2004

(86) PCT No.: PCT/JP2004/019629

§ 371 (c)(1),
(2), (4) Date: Apr. 27, 2006

(87) PCT Pub. No.: WO2005/067080

PCT Pub. Date: Jul. 21, 2005

(65) Prior Publication Data

US 2007/0122715 A1    May 31, 2007

(30) Foreign Application Priority Data

Jan. 9, 2004  (JP) .............................. 2004-003873

(51) Int. Cl.
*H01M 2/14* (2006.01)
(52) U.S. Cl. ...................... 429/133; 429/131; 429/129; 429/136; 429/137
(58) Field of Classification Search ........................ None
See application file for complete search history.

(56) References Cited

U.S. PATENT DOCUMENTS 5,902,697 A    5/1999    Guindy et al.

(Continued)

FOREIGN PATENT DOCUMENTS

JP    7-220759 A    8/1995

(Continued)

OTHER PUBLICATIONS

Korean Office Action for Corresponding Application KR 10-2006-7004149 Dated Jan. 17, 2007.

(Continued)

*Primary Examiner*—Patrick Ryan
*Assistant Examiner*—Cynthia Lee
(74) *Attorney, Agent, or Firm*—McDermott Will & Emery LLP (57) ABSTRACT

A lithium ion secondary battery in which an abnormal overheat due to a short circuit of a current collecting portion of one electrode and an electrode material mixture of the other is prevented. The lithium ion secondary battery has: a positive electrode including a core material having a current collecting portion and a material mixture carrying portion and a material mixture layer carried thereon; a negative electrode including a core material having a current collecting portion and a material mixture carrying portion and a material mixture layer carried thereon; a separator and a porous electron-insulating layer including an inorganic oxide filler and a binder both interposed between the positive and negative electrodes; and a non-aqueous electrolyte. The insulating layer is carried on a region including surfaces of the positive electrode current collecting portion and material mixture layer, and/or a region including surfaces of the negative electrode current collecting portion and material mixture layer. The positive and negative electrodes are wound with the separator and the insulating layer interposed therebetween.

16 Claims, 3 Drawing Sheets

U.S. PATENT DOCUMENTS 6,090,506 A 7/2000 Inoue et al.
6,335,114 B1 * 1/2002 Ueshima et al. ............... 429/94

FOREIGN PATENT DOCUMENTS

JP 2003-142078 A 5/2003

OTHER PUBLICATIONS

Chinese Office Action, with English Translation, issued in Chinese Patent Application No. CN 2004800288687, mailed on Feb. 29, 2008.

* cited by examiner

LITHIUM ION SECONDARY BATTERY

RELATED APPLICATIONS

This application is the U.S. National Phase under 35 U.S.C. §371 of International Application No. PCT/JP2004/019629, filed on Dec. 28, 2004, which in turn claims the benefit of Japanese Application No. 2004-003873, filed on Jan. 9, 2004, the disclosure of which Applications are incorporated by reference herein.

TECHNICAL FIELD

The present invention relates to a lithium ion secondary battery which is excellent in heat resistance, and in which an internal short circuit and an abnormal overheat of a battery is highly suppressed.

BACKGROUND ART

In chemical batteries such as lithium ion secondary batteries, between a positive electrode and a negative electrode, interposed is a separator having functions to electronically insulate between the positive electrode and the negative electrode and further to retain a non-aqueous electrolyte. Currently, in lithium ion secondary batteries, a microporous film comprising a polyolefin resin such as polyethylene and polypropylene is used as the separator. The microporous film is usually manufactured by drawing a sheet obtained by a molding method such as an extrusion.

However, in general, microporous films easily shrink under a high temperature, and there is a possibility for an expansion of a short circuit portion by the shrinkage, due to a short circuit reaction heat generated instantly at the time when an internal short circuit occurs or when a sharp-shaped matter penetrates through a battery. Such expansion of the short circuit portion generates further reaction heat, thereby accelerating an abnormal overheat of the battery. Further, when the battery is placed under a high temperature of 150° C. or more, the microporous film shrinks or melts, causing a possibility for a deformation of an electrode plate assembly (especially a wound type electrode plate assembly), a short circuit between the positive and negative electrodes, and an abnormal overheat.

In view of preventing an internal short circuit that occurs during a manufacturing process, in a non-aqueous electrolyte secondary battery having a negative electrode comprising a current collector and a negative electrode active material applied layer, a positive electrode comprising a current collector and a positive electrode active material applied layer, and a non-aqueous electrolyte, there has been proposed to form a porous protection film with a thickness of 0.1 to 200 μm on the surface of the negative electrode active material applied layer or the positive electrode active material applied layer. Herein, the porous protection film comprises a resin binder and a solid particle (patent document 1). Patent Document 1: Japanese Laid-Open Patent Publication No. Hei 7-220759

DISCLOSER OF THE INVENTION

Problems to be Solved by the Invention

Based on knowledge of the inventors of the present invention, in many cases, the internal short circuit occurs when a current collecting portion where an electrode material mixture is not carried of one electrode makes contact with an electrode material mixture of the other electrode. Especially, the short circuit reaction heat due to a contact of a positive electrode current collecting portion and a negative electrode material mixture is extremely large, and a possibility for the battery to be damaged by such contact is relatively high.

However, the technique of patent document 1 is to form the porous protection film only on the surface of the positive electrode active material applied layer or the negative electrode active material applied layer. Therefore, the contact cannot be avoided between the current collecting portion where the electrode material mixture is not carried of one electrode and the electrode material mixture of the other electrode.

Means for Solving the Problem

In light of the above, in the present invention, in view of avoiding the contact between the current collecting portion where the electrode material mixture is not carried of one electrode and the electrode material mixture of the other electrode, a lithium ion secondary battery having a structure as in below is proposed, in which a porous insulating layer is interposed between the positive electrode and the negative electrode in addition to the separator.

That is, the present invention firstly relates to a lithium ion secondary battery comprising: a positive electrode comprising a positive electrode core material including a positive electrode current collecting portion and a material mixture carrying portion, and a positive electrode material mixture layer including a lithium-containing composite oxide and being carried on the material mixture carrying portion; a negative electrode comprising a negative electrode core material including a negative electrode current collecting portion and a material mixture carrying portion, and a negative electrode material mixture layer including a material capable of absorbing and desorbing lithium and being carried on the material mixture carrying portion; a separator interposed between the positive electrode and the negative electrode; a porous electron-insulating layer interposed between the positive electrode and the negative electrode and including an inorganic oxide filler and a binder; and a non-aqueous electrolyte; the porous electron-insulating layer being carried on a region including surfaces of the positive electrode current collecting portion and the positive electrode material mixture layer, and the positive electrode and the negative electrode being wound with the separator and the porous electron-insulating layer interposed therebetween.

The present invention secondly relates to a lithium ion secondary battery comprising: a positive electrode comprising a positive electrode core material including a positive electrode current collecting portion and a material mixture carrying portion, and a positive electrode material mixture layer including a lithium-containing composite oxide and being carried on the material mixture carrying portion; a negative electrode comprising a negative electrode core material including a negative electrode current collecting portion and a material mixture carrying portion, and a negative electrode material mixture layer including a material capable of absorbing and desorbing lithium and being carried on the material mixture carrying portion; a separator interposed between the positive electrode and the negative electrode; a porous electron-insulating layer interposed between the positive electrode and the negative electrode and including an inorganic oxide filler and a binder; and a non-aqueous electrolyte; the porous electron-insulating layer being carried on a region including surfaces of the negative electrode current collecting portion and the negative electrode material mixture layer, and the positive electrode and the negative electrode being wound with the separator and the porous electron-insulating layer interposed therebetween.

The present invention thirdly relates to a lithium ion secondary battery comprising: a positive electrode comprising a positive electrode core material including a positive electrode current collecting portion and a material mixture carrying portion, and a positive electrode material mixture layer including a lithium-containing composite oxide and being carried on the material mixture carrying portion; a negative electrode comprising a negative electrode core material including a negative electrode current collecting portion and a material mixture carrying portion, and a negative electrode material mixture layer including a material capable of absorbing and desorbing lithium and being carried on the material mixture carrying portion; a separator interposed between the positive electrode and the negative electrode; a porous electron-insulating layer interposed between the positive electrode and the negative electrode and including an inorganic oxide filler and a binder; a non-aqueous electrolyte; the porous electron-insulating layer being carried on a region including surfaces of the positive electrode current collecting portion and the positive electrode material mixture layer and on a region including surfaces of the negative electrode current collecting portion and the negative electrode material mixture layer, and the positive electrode and the negative electrode being wound with the separator and the porous electron-insulating layer interposed therebetween.

That is, in a lithium ion secondary battery of the present invention, in at least one of the positive electrode and the negative electrode, the porous electron-insulating layer is carried on the current collecting portion of the electrode core material where the electrode material mixture is not carried, not only on the surface of the electrode material mixture layer. Thus, even when the separator shrinks by heat at the time of an occurrence of an internal short circuit, when a sharp-shaped matter such as a nail penetrates through a battery, or when the battery is placed under a high temperature of 150° C. or more, a contact can be avoided between the current collecting portion where the electrode material mixture is not carried of one electrode and the electrode material mixture of the other electrode. Therefore, an abnormal overheat of a battery can be highly suppressed.

In a lithium ion secondary battery of the present invention, a portion of a strip positive electrode lead and a portion of a strip negative electrode lead are preferably welded to the positive electrode current collecting portion and the negative electrode current collecting portion, respectively. In such case, a lithium ion secondary battery of the present invention preferably has a structure as in below.

First, can be mentioned a structure in which the positive electrode current collecting portion and/or the negative electrode current collecting portion has an exposed region where the porous electron-insulating layer is not carried, and a portion of the lead is welded to the exposed region.

Second, can be mentioned a structure in which the porous electron-insulating layer is also carried on at least a portion of the positive electrode lead and/or a portion of the negative electrode lead, a portion of the lead being disposed on the current collecting portion.

The lead portion comprising the current collecting portion and the electrode lead has a further increased thickness than the current collecting portion. Thus, the possibility for the lead portion of one electrode to contact with the electrode material mixture of the other electrode is high. According to the second structure in the above, since the porous electron-insulating layer is carried on the lead portion as well, the previously mentioned short circuit of the lead portion and the electrode material mixture can be avoided. Thus, an abnormal overheat of a battery can be further highly suppressed.

The binder included in the porous electron-insulating layer preferably includes a resin material including at least one selected from the group consisting of an acrylonitrile unit, an acrylate unit, and a methacrylate unit.

Since such resin material is excellent in binding ability, even the amount of resin material is small relative to that of the inorganic oxide filler, the porous electron-insulating layer with a higher strength can be formed.

Effects of the Invention

According to the present invention, in a lithium ion secondary battery in which a porous insulating layer is interposed between the positive electrode and the negative electrode in addition to the separator, an internal short circuit and an abnormal overheat of a battery can be highly suppressed.

Additionally, since the structure of the present invention can be effectively realized by controlling the region on which the porous electron-insulating layer is carried at the time of manufacturing an electrode, manufacturing costs do not drastically increase compared with the conventional cases.

BEST MODE FOR CARRYING OUT THE INVENTION

A lithium ion secondary battery of the present invention comprises a positive electrode comprising a positive electrode core material including a positive electrode current collecting portion and a material mixture carrying portion, and a positive electrode material mixture layer carried on the material mixture carrying portion. For the positive electrode current collecting portion, a region in the positive electrode core material where a positive electrode material mixture is not carried is utilized. The material mixture carrying portion exists on both sides of the positive electrode core material, respectively.

Positive electrode core materials usually have a strip-like shape. The thickness of the positive electrode core material is not particularly limited, but preferably is 10 to 50 µm. For the material of the positive electrode core material, Al and the like are preferably used. The surface of the positive electrode core material can be flat, or have bumps and dips, holes, and slits. For example, a lath plate and a punched metal can be used. Also, the positive electrode core material may be three-dimensionally processed to give a certain apparent thickness.

In a strip-shaped positive electrode core material, for example, the positive electrode current collecting portion is formed on one end portion at a longitudinal direction. The one end portion at the longitudinal direction corresponds to the start point of winding or the end point of winding.

A lithium ion secondary battery of the present invention has a negative electrode comprising a negative electrode core material including a negative electrode current collecting portion and a material mixture carrying portion, and a negative electrode material mixture layer carried on the material mixture carrying portion. For the negative electrode current collecting portion, a region in the negative electrode core material where a negative electrode material mixture is not carried is utilized. The material mixture carrying portion exists on both sides of the negative electrode core material, respectively.

Negative electrode core materials usually have a strip-like shape. The thickness of the negative electrode core material is not particularly limited, but preferably is 10 to 50 μm. For the material of the negative electrode core material, Cu and the like are preferably used. The surface of the negative electrode core material can be flat, or have bumps and dips, holes, and slits. For example, a lath plate and a punched metal can be used. Also, the negative electrode core material may be three-dimensionally processed to give a certain apparent thickness.

In a strip-shaped negative electrode core material, for example, the negative electrode current collecting portion is formed on one end portion at a longitudinal direction. The one end portion at the longitudinal direction corresponds to the start point of winding or the end point of winding.

Usually, when the positive electrode current collecting portion corresponds to the start point of winding, the negative electrode current collecting portion corresponds to the end point of winding, and when the positive electrode current collecting portion corresponds to the end point of winding, the negative electrode current collecting portion corresponds to the start point of winding. However, the arrangement is not limited to the above described arrangement.

Between the positive electrode and the negative electrode, a separator and a porous electron-insulating layer are interposed. Separators usually comprise a resin-made microporous film. The microporous film is usually manufactured by drawing a resin sheet obtained by a molding method such as an extrusion. The resin sheet is manufactured from a resin or a resin composition. The resin composition may include a filler, for example, in addition to a resin. The separator is disposed between the positive electrode and the negative electrode to prevent a short circuit between the electrodes. The separator has pores for appropriately passing the non-aqueous electrolyte.

For the resin as a separator material, polyolefin resins such as polyethylene and polypropylene are preferably used, but not limited thereto. For example, polyimide, polyamide, polyamide-imide, and aramid may be used as well. These resins may be used alone, or may be used in combination of two or more kinds in the separator.

The thickness of the separator is not particularly limited, but in view of maintaining the design capacity of battery, the thickness is preferably 10 to 25 μm, and the sum of the thicknesses of the separator and the porous electron-insulating layer is preferably 15 to 30 μm.

The porous electron-insulating layer includes an inorganic oxide filler and a binder, and has pores for appropriately passing the non-aqueous electrolyte. The porous electron-insulating layer has functions similar to that of the separator, but the porous electron-insulating layer has a structure in which the particles of inorganic oxide filler are bound by the binder. Thus, the porous electron-insulating layer has a smaller tensile strength in the plane direction than that of the separator. Unlike the separator, the porous electron-insulating layer does not shrink by heat even when it is exposed to a high temperature. Thus, the porous electron-insulating layer has a function to prevent, when an internal short circuit occurs or a battery is exposed to a high temperature, expansion of the short circuit, thereby preventing an abnormal overheat.

The inorganic oxide filler content in the porous electron-insulating layer is preferably 50 wt % or more and 99 wt % or less, and further preferably 90 wt % or more and 99 wt % or less. The inorganic oxide filler content below 50 wt % makes the binder excessive, which may cause difficulty in controlling the microporous structure formed by gaps among the filler particles. On the other hand, the inorganic oxide filler content of over 99 wt % makes the binder scarce, which may cause deteriorations of the strength of the porous electron-insulating layer and adhesion thereof to the electrode surface. The separation of the porous electron-insulating layer causes damage to the functions of the porous electron-insulating layer itself, thereby causing damage to battery performance as well.

Although the median size (D50: average particle size) of the inorganic oxide filler is not particularly limited, generally, the median size is in the range of 0.1 to 5 μm, and desirably 0.2 to 1.5 μm.

Although the thickness of the porous electron-insulating layer is not particularly limited, in view of securing the effects of the porous electron-insulating layer fully and keeping the design capacity, the thickness is preferably 0.5 to 20 μm, and particularly preferably 2 to 10 μm. Also, the sum of the separator thickness and the porous electron-insulating layer thickness is desirably about 15 to 30 μm.

The porous electron-insulating layer is carried on a region including surfaces of the positive electrode current collecting portion and the positive electrode material mixture layer (hereinafter, a first region), and/or a region including surfaces of the negative electrode current collecting portion and the negative electrode material mixture layer (hereinafter, a second region). The first region includes at least a part of the positive electrode current collecting portion, and the second region includes at least a part of the negative electrode current collecting portion.

However, since the positive electrode and the negative electrode are wound with the separator and the porous electron-insulating layer interposed therebetween to form an electrode plate assembly, in the electrode plate assembly, the porous electron-insulating layer is preferably carried on a region of the current collecting portion which faces the material mixture layer of the other electrode, in view of improving safety.

If the porous electron-insulating layer is carried on the separator, for example, despite the heat resistance of the porous electron-insulating layer, due to the heat generated by an internal short circuit, the porous electron-insulating layer shrinks as well along with the separator. Also, if a mixture including the inorganic oxide filler and the binder is formed into a sheet, for example, in view of keeping the sheet shape, the sheet thickness has to be considerably large, and additionally, a large amount of binder becomes necessary. Thus, in terms of battery performance and the design capacity, it is unpractical. On the other hand, when the porous electron-insulating layer is carried on the above first region and/or the second region, such problems do not occur.

Also, if the porous electron-insulating layer is carried only on the surface of the electrode material mixture layer, at the time of occurrence of an internal short circuit or under a high temperature, there is a possibility of contact between the current collecting portion where the electrode material mixture is not carried of one electrode, and the electrode material mixture of the other electrode. In that case, a great amount of short circuit reaction heat is generated, and the abnormal overheat may be caused in the battery. On the other hand, when the porous electron-insulating layer is carried on the above first region and/or the second region, even when the separator shrinks by heat at the time of an internal short circuit occurrence or under a high temperature, the possibility for the current collecting portion of one electrode and the electrode material mixture of the other electrode to contact will decrease.

When the porous electron-insulating layer is carried only on the first region, it is required that all the surfaces of two positive electrode material mixture layers on both sides of the positive electrode core material be covered by the porous electron-insulating layer. On the other hand, regarding the positive electrode current collecting portion, it is sufficient that at least a part of the positive electrode current collecting portion is covered by the porous electron-insulating layer. In the case when only a part of the positive electrode current collecting portion is covered by the porous electron-insulating layer, a certain degree of the effects of the present invention can be obtained, since a contact between the part of the positive electrode current collecting portion and the negative electrode material mixture can be avoided. However, in order to further reliably prevent the contact between the positive electrode current collecting portion and the negative electrode material mixture, it is preferable that the entire surface of the positive electrode current collecting portion is covered by the porous electron-insulating layer.

When the porous electron-insulating layer is carried only on the second region, it is required that all the surfaces of two negative electrode material mixture layers on both sides of the negative electrode core material be covered by the porous electron-insulating layer. On the other hand, regarding the negative electrode current collecting portion, it is sufficient that at least a part of the negative electrode current collecting portion is covered by the porous electron-insulating layer. In the case when only a part of the negative electrode current collecting portion is covered by the porous electron-insulating layer, a certain degree of the effects of the present invention can be obtained, since a contact between the part of the negative electrode current collecting portion and the positive electrode material mixture can be avoided. However, in order to further reliably prevent the contact between the negative electrode current collecting portion and the positive electrode material mixture, it is preferable that the entire surface of the negative electrode current collecting portion is covered by the porous electron-insulating layer.

In the case when the porous electron-insulating layer is carried on both the first region and the second region, all the surfaces of two positive electrode material mixture layers and all the surfaces of two negative electrode material mixture layers may be covered by the porous electron-insulating layer as well. However, in the surface region of the positive electrode material mixture layer facing the negative electrode material mixture layer, on which the porous electron-insulating layer is carried, the porous electron-insulating layer is not necessarily carried. Additionally, in the surface region of the negative electrode material mixture layer facing the positive electrode material mixture layer, on which the porous electron-insulating layer is carried, the porous electron-insulating layer is not necessarily carried.

The structure of the porous electron-insulating layer is explained in the following.

The porous electron-insulating layer includes an inorganic oxide filler and a binder. Since the inorganic oxide filler has a high heat resistance, even when the temperature of a battery becomes relatively high, the mechanical strength of the porous electron-insulating layer can be kept high. The binder also desirably has a high heat resistance.

Although various resin materials can be used for the binder of the porous electron-insulating layer, a resin material with a thermal decomposition temperature of 250° C. or more observed by a thermal analysis is desirable, for example. Additionally, since the resin material desirably does not drastically deform under a high temperature, the resin material is preferably amorphous or non-crystalline and has no crystalline melting point. Additionally, when the resin material is crystalline, the crystalline melting point is desirably 250° C. or more.

In so-called nail penetration test, depending upon the test conditions, the temperature due to the generated heat at the time of an internal short circuit locally exceeds several hundreds ° C. Therefore, when the porous electron-insulating layer includes a crystalline resin material with a low thermal deformation temperature or a low crystalline melting point, and even when the resin material is amorphous or non-crystalline, but has a low thermal decomposition temperature, the porous electron-insulating layer may be softened or burned, causing a possibility for deformation.

The thermal decomposition temperature, crystalline melting point, or thermal deformation temperature of the resin material can be measured by a differential scanning calorimetry (DSC) or a thermogravimetry-differential thermal analysis (TG-DTA). For example, the starting point of the weight change in the TG-DTA measurement corresponds to the thermal decomposition temperature, and an inflection point in the DSC measurement corresponds to the thermal deformation temperature or the crystalline melting point.

The binder for the porous electron-insulating layer desirably includes a resin material including at least one monomer unit selected from the group consisting of an acrylonitrile unit, an acrylate unit, and a methacrylate unit. Such resin material can be a polymer comprising substantially one kind of monomer unit, or a random copolymer, a block copolymer, a graft copolymer or the like comprising two or more kinds of monomer unit.

At the time of winding the positive electrode and the negative electrode with the separator and the porous electron-insulating layer interposed therebetween, stress is applied to the porous electron-insulating layer. Thus, the binder included in the porous electron-insulating layer preferably has flexibility. The porous electron-insulating layer including an amorphous resin material as a binder can keep the production yields higher, since damages such as cracks are not caused easily when winding the electrode plates, unlike a hard porous electron-insulating layer including a crystalline binder.

Additionally, by using a resin material including at least one monomer unit selected from the group consisting of an acrylonitrile unit, an acrylate unit, and a methacrylate unit for the porous electron-insulating layer, a balance among heat resistance, binding ability, and lithium ion permeability is secured, and a lithium ion secondary battery which can achieve both safety and high-rate characteristic can be obtained.

Although various kinds of resin particles are common as a filler, for the filler of the porous electron-insulating layer, in addition to heat-resistance, electrochemical stability in the environment in lithium ion secondary battery is required. Thus, a filler comprising an inorganic oxide which satisfies these requirements are preferably used. The porous electron-insulating layer is formed by preparing a paint including a filler and a binder, and applying the paint on a predetermined surface of the electrode. Thus, the inorganic oxide filler is also required to be suitable for making it into a paint.

Alumina, titania, zirconia, magnesia, and the like can be mentioned as an example which satisfies the above requirements. Among these examples, in terms of safety, costs, ease in handling, and the like, alumina, particularly α-alumina, is especially preferable.

A plurality of kinds of inorganic oxide filler may be mixed for the usage. For example, in the case when the same kind of inorganic oxide filler with different median sizes are to be mixed, a dense porous electron-insulating layer can be obtained. Also, a plurality of porous electron-insulating layers including different inorganic oxide fillers may be laminated.

In an embodiment of the present invention, a part of a strip positive electrode lead and a part of a strip negative electrode lead are welded to the positive electrode current collecting portion and the negative electrode current collecting portion, respectively. The positive electrode lead serves to connect the positive electrode and an outer positive electrode terminal of the battery, and the negative electrode lead serves to connect the negative electrode and an outer negative electrode terminal of the battery. The material of the positive electrode lead is preferably Al or the like, and the material of the negative electrode lead is preferably Ni, Cu, or the like. Also, the thickness of each lead is preferably 50 to 200 μm.

Figure 1:
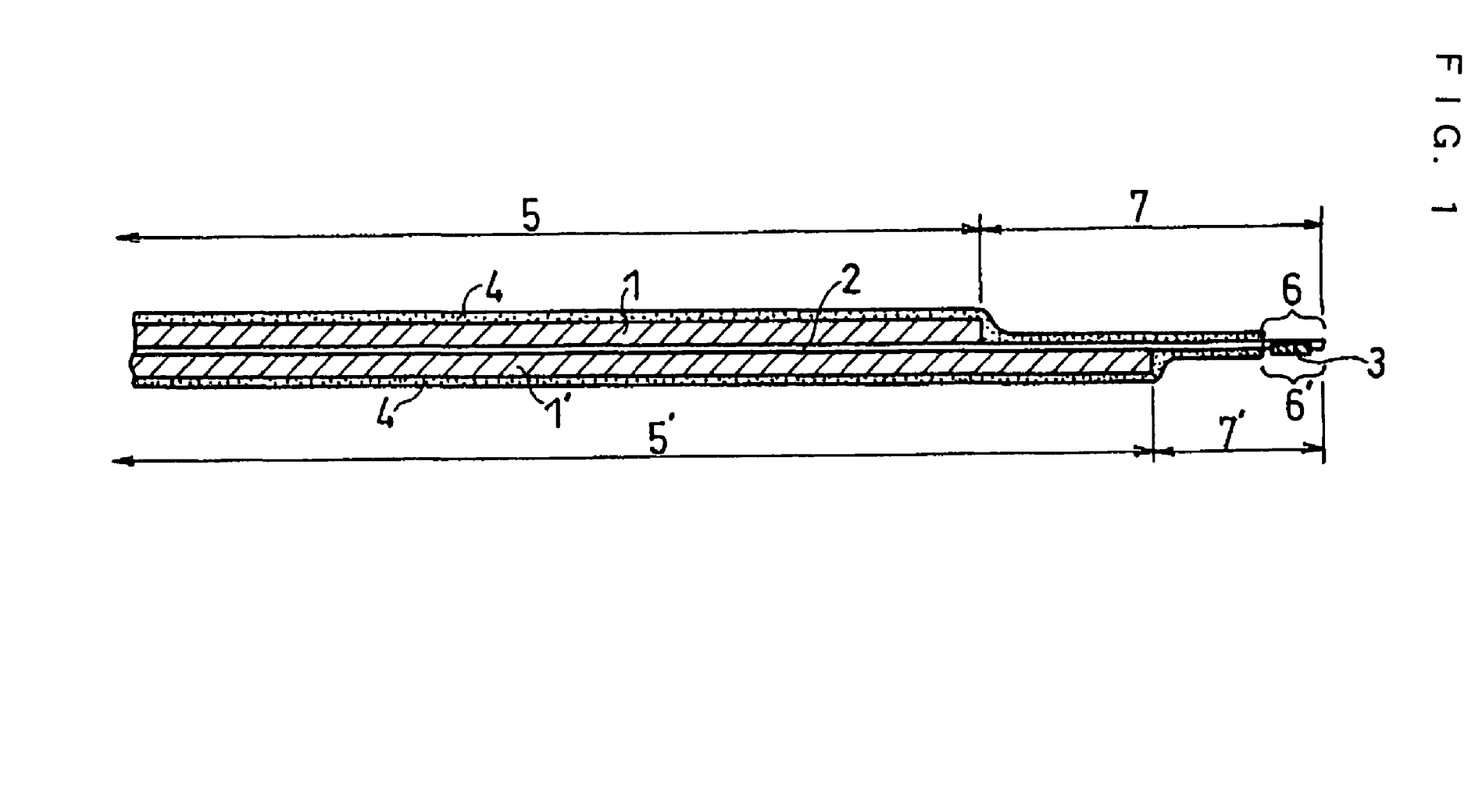
FIG. 1 A schematic vertical cross sectional view of an electrode plate of an embodiment of the present invention.

When the positive electrode current collecting portion has an exposed region not carrying the porous electron-insulating layer, a part of the positive electrode lead can be welded to the exposed region. Also, when the negative electrode current collecting portion has an exposed region not carrying the porous electron-insulating layer, a part of the negative electrode lead can be welded to the exposed region. FIG. 1 shows a schematic cross sectional view of an electrode plate having the above structure.

In FIG. 1, on one end of a strip electrode core material 2 at a longitudinal direction thereof, two regions 7 and 7' not supporting the material mixture serving as the current collecting portion exist. On the material mixture carrying portions 5 and 5' of the electrode core material 2, electrode material mixture layers 1 and 1' are respectively carried. The regions 7 and 7' have exposed regions 6 and 6' not carrying the porous electron-insulating layer 4, respectively, and to the exposed region 7'. 6', a part of a strip electrode lead 3 is welded.

As shown in FIG. 1, in the longitudinal direction of the electrode core material, the lengths of the regions 7 and 7' not carrying the material mixture are desirably different. The length of the region 7 is larger than the length of the region 7'.

In FIG. 1, although the porous electron-insulating layer 4 is carried on the entire region of the regions 7 and 7' not supporting the material mixture except for the exposed regions 6 and 6', the porous electron-insulating layer 4 is not necessarily carried on such entire region. For example, in some cases, the porous electron-insulating layer 4 is not carried on one of the regions 7 and 7'.

The exposed regions 6 and 6' can be formed by intermittently applying a paint including raw materials of the porous electron-insulating layer 4 while providing the unapplied regions to become the exposed regions 6 and 6', or by peeling the porous electron-insulating layer 4 once carried.

Figure 2:
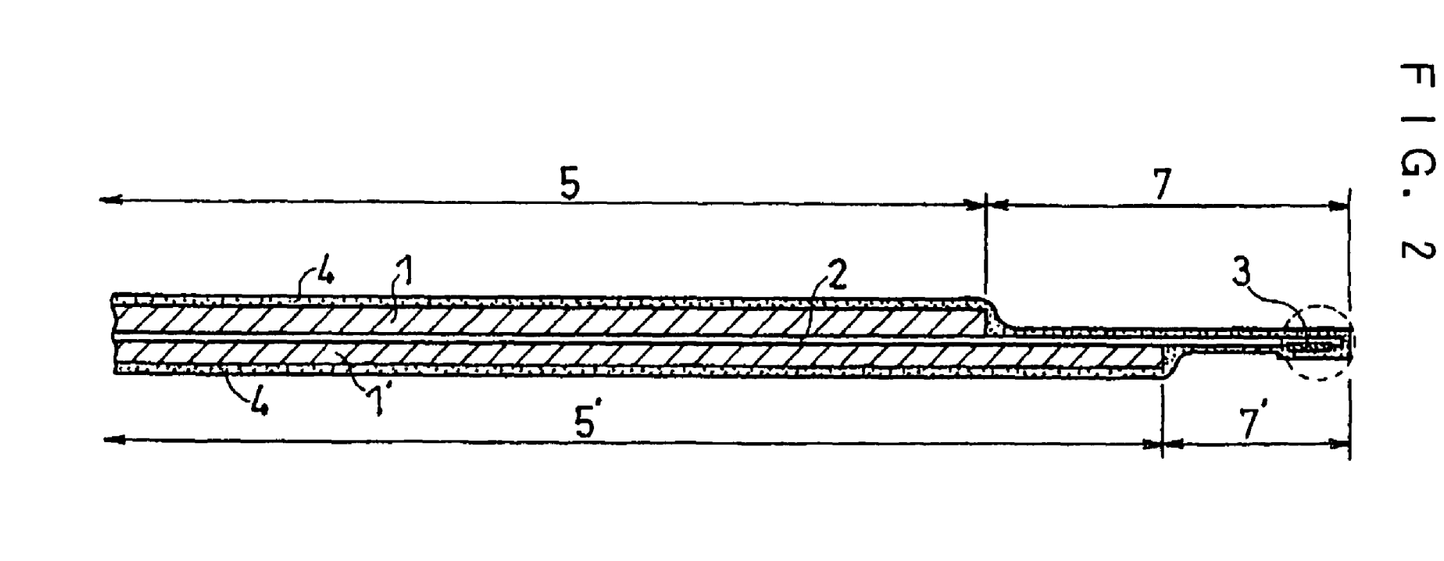
FIG. 2 A schematic vertical cross sectional view of an electrode plate of another embodiment of the present invention.

In order to further improve safety, the exposed regions 6 and 6' are preferably not provided as shown in FIG. 1, and an electrode plate having a structure as shown in FIG. 2 is preferably manufactured. In FIG. 2, the porous electron-insulating layer 4 is carried also on the electrode lead portion disposed on the current collecting portion (region encircled by a broken line in the FIG.). Although the lead portion comprising the current collecting portion and the electrode lead has a further increased thickness than the current collecting portion, based on the structure in FIG. 2, the possibility for the lead portion with the increased thickness to contact with the electrode material mixture of the other electrode decreases remarkably.

In the following, structures of the positive electrode material mixture layer and the negative electrode material mixture layer are explained in detail.

The positive electrode material mixture layer includes a lithium-containing composite oxide as a positive electrode active material. The positive electrode material mixture layer generally comprises a positive electrode material mixture including the positive electrode active material comprising a lithium-containing composite oxide, a positive electrode binder, and a conductive agent. However, the positive electrode material mixture may include various additives, in addition to the positive electrode active material, the positive electrode binder, and the conductive agent.

For the lithium-containing composite oxide, lithium cobaltate ($LiCoO_2$), modified lithium cobaltate, lithium nickelate ($LiNiO_2$), modified lithium nickelate, lithium manganate ($LiMn_2O_4$), modified lithium manganate, and these oxides in which a part of Co, Mn, or Ni is replaced with other transition metal element are preferable. Some of the modified substance include an element such as aluminum and magnesium. Some include at least two kinds selected from cobalt, nickel, and manganese. An Mn-type lithium-containing transition metal oxide such as $LiMn_2O_4$ is especially a potential material in the sense that it exists on Earth in abundance and is low in costs.

For the positive electrode binder, polytetrafluoroethylene (PTFE), modified acrylonitrile rubber particle (BM-500B manufactured by Zeon Corporation, and the like), and polyvinylidene fluoride (PVDF) may be used, but not limited thereto. PTFE and BM-500B are preferably used in combination with carboxymethyl cellulose (CMC), polyethylene oxide (PEO), or modified acrylonitrile rubber (BM-720H manufactured by Zeon Corporation, and the like), which serves as a thickener for a raw material paste of the positive electrode material mixture layer. PVDF alone functions to work both as a positive electrode binder and as a thickener.

For the conductive agent, acetylene black, Ketjen black, various graphites, and the like may be used. These may be used alone, or may be used in combination of two or more kinds.

The negative electrode material mixture layer includes a material capable of absorbing and desorbing lithium as a negative electrode active material. The negative electrode material mixture layer generally comprises a negative electrode material mixture including a negative electrode active material and a negative electrode binder. However, the negative electrode material mixture may include various additives, in addition to the negative electrode active material and the negative electrode binder.

Herein, for the material capable of absorbing and desorbing lithium, carbon materials such as various natural graphites, various artificial graphites, petroleum coke, carbon fiber, and baked organic polymer; silicon-containing composite material such as oxides and silicide; various metals or alloy materials may be used.

For the negative electrode binder, as for the positive electrode binder, PTFE, modified acrylonitrile rubber particle, PVDF, and cellulose resins such as CMC may be used, but not limited thereto. However, rubber polymer is used preferably. For such rubber polymer, in order to improve lithium ion acceptability of the negative electrode, a rubber polymer including a styrene unit and a butadiene unit is used preferably. For example, styrene-butadiene copolymer (SBR), and modified SBR may be used, but not limited thereto.

A composition of the non-aqueous electrolyte is explained in detail in the following.

For the non-aqueous electrolyte, a non-aqueous solvent which dissolves a lithium salt as a solute is preferably used. The concentration of the solute to be dissolved in the non-aqueous solvent is generally 0.5 to 2 mol/L.

For the lithium salt, lithium hexafluorophosphate (LiPF$_6$), lithium perchlorate (LiClO$_4$), lithium tetrafluoroborate (LiBF$_4$), and the like are preferably used.

For the non-aqueous solvent, ethylene carbonate (EC), propylene carbonate (PC), dimethyl carbonate (DMC), diethyl carbonate (DEC), methyl ethyl carbonate (MEC) are preferably used, alone or in any combination. One kind of the non-aqueous solvent can be used alone, but a combination of two or more kinds thereof is preferable.

In order to secure the stability at the time of over-charge by forming an excellent film on the positive electrode and/or the negative electrode, vinylene carbonate (VC), cyclohexylbenzene (CHB), modified VC and CHB, and the like may be used as well.

EXAMPLE 1

A lithium ion secondary battery of cylindrical type 18650 was prepared in the following manner.

(i) Preparation of Positive Electrode

A positive electrode material mixture paste was prepared by mixing 3 kg of lithium cobaltate, 1 kg of PVDF#1320 (N-methyl-2-pyrrolidone (hereinafter, NMP) solution including 12 wt % of PVDF) manufactured by Kureha Corporation as a binder, 90 g of acetylene black, and an appropriate amount of NMP in a double-arm kneader.

The positive electrode material mixture paste was applied on both sides of a positive electrode core material comprising an aluminum foil with a thickness of 15 μm, leaving a predetermined current collecting portion, and dried. Subsequently, the positive electrode core material carrying the positive electrode material mixture was rolled, so that the positive electrode core material carried positive electrode material mixture layers. At this time, the thickness of the positive electrode plate comprising the aluminum foil and the positive electrode material mixture layers on both sides thereof was controlled to be 160 μm.

Afterwards, the electrode plate was cut to give a width and a length that could be inserted into a battery case of the cylindrical battery with the size of an 18 mm diameter and a 65 mm height, to obtain a strip positive electrode. On one end of the obtained positive electrode at a longitudinal direction thereof, the current collecting portion comprising regions 7 and 7' not supporting the material mixture as shown in FIG. 1 was provided. The lengths of the region 7 and the region 7' were 50 mm and 30 mm, respectively.

(ii) Preparation of Negative Electrode

A negative electrode material mixture paste was prepared by mixing 3 kg of artificial graphite, 75 g of BM-400B (an aqueous dispersion including 40 wt % of styrene-butadiene copolymer) manufactured by Zeon Corporation, 30 g of carboxymethyl cellulose (CMC) as a thickener, and an appropriate amount of water by a double-arm kneader.

The negative electrode material mixture paste was applied on both sides of a negative electrode core material comprising a copper foil with a thickness of 10 μm, leaving a predetermined current collecting portion, and dried. Subsequently, the negative electrode core material carrying the negative electrode material mixture was rolled, so that the negative electrode core material carried negative electrode material mixture layers. At this time, the thickness of the negative electrode plate comprising the copper foil and the negative electrode material mixture layers on both sides thereof was controlled to be 180 μm.

Afterwards, the negative electrode plate was cut to give a width and a length that could be inserted into the battery case of the cylindrical battery with the size of an 18 mm diameter and a 65 mm height, to obtain a strip negative electrode. On one end of the obtained negative electrode at a longitudinal direction thereof, the current collecting portion comprising regions 7 and 7' not supporting the material mixture as shown in FIG. 1 was provided. The lengths of the region 7 and the region 7' were 13 mm and 80 mm, respectively.

(iii) Preparation of Electrolyte

To a solvent mixture including ethylene carbonate (EC), dimethyl carbonate (DMC), and ethyl methyl carbonate (EMC) with the volume ratio of 2:3:3, LiPF$_6$ was dissolved with the concentration of 1 mol/L, and further 3 wt % of vinylene carbonate (VC) was added thereto, to prepare a non-aqueous electrolyte.

(iv) Preparation of Raw Material Paint of Porous Electron-Insulating Layer

A raw material paint of a porous electron-insulating layer was prepared by mixing 970 g of alumina with a median diameter of 0.3 μm as an inorganic oxide filler, 375 g of BM-720H (NMP solution including 8 wt % of a polymer including an acrylonitrile unit) manufactured by Zeon Corporation as a binder, and an appropriate amount of NMP, by a double-arm kneader.

(v) Battery Assembly

One end of an aluminum-made positive electrode lead 35a (width 3.5 mm×length 71 mm×thickness 150 μm) was welded to a region having an 8 mm-width (hereinafter, a region A) extending from the outermost end at a longitudinal direction of the current collecting portion of a positive electrode 35.

One end of a nickel-made negative electrode lead 36a (width 3 mm×length 66.5 mm×thickness 100 μm) was welded to a region having an 8 mm-width (hereinafter, a region B) extending from the outermost end at a longitudinal direction of the current collecting portion of a negative electrode 36.

To the surfaces of positive electrode material mixture layers on both sides of the positive electrode 35 and the current collecting portion excluding the region A, the raw material paint of the porous electron-insulating layer was applied respectively, and dried, to form a porous electron-insulating layer with a thickness of 5 μm.

The positive electrode 35 carrying the porous electron-insulating layer (not shown) and the negative electrode 36 were wound with a separator 37 comprising a polyethylene resin-made microporous film which is wider than the both electrode plates and has a thickness of 20 μm interposed therebetween, to form an electrode plate assembly. At this time, the current collecting portion of the negative electrode was positioned at the winding core side, and the current collecting portion of the positive electrode was positioned at the outermost perimeter.

Figure 3:
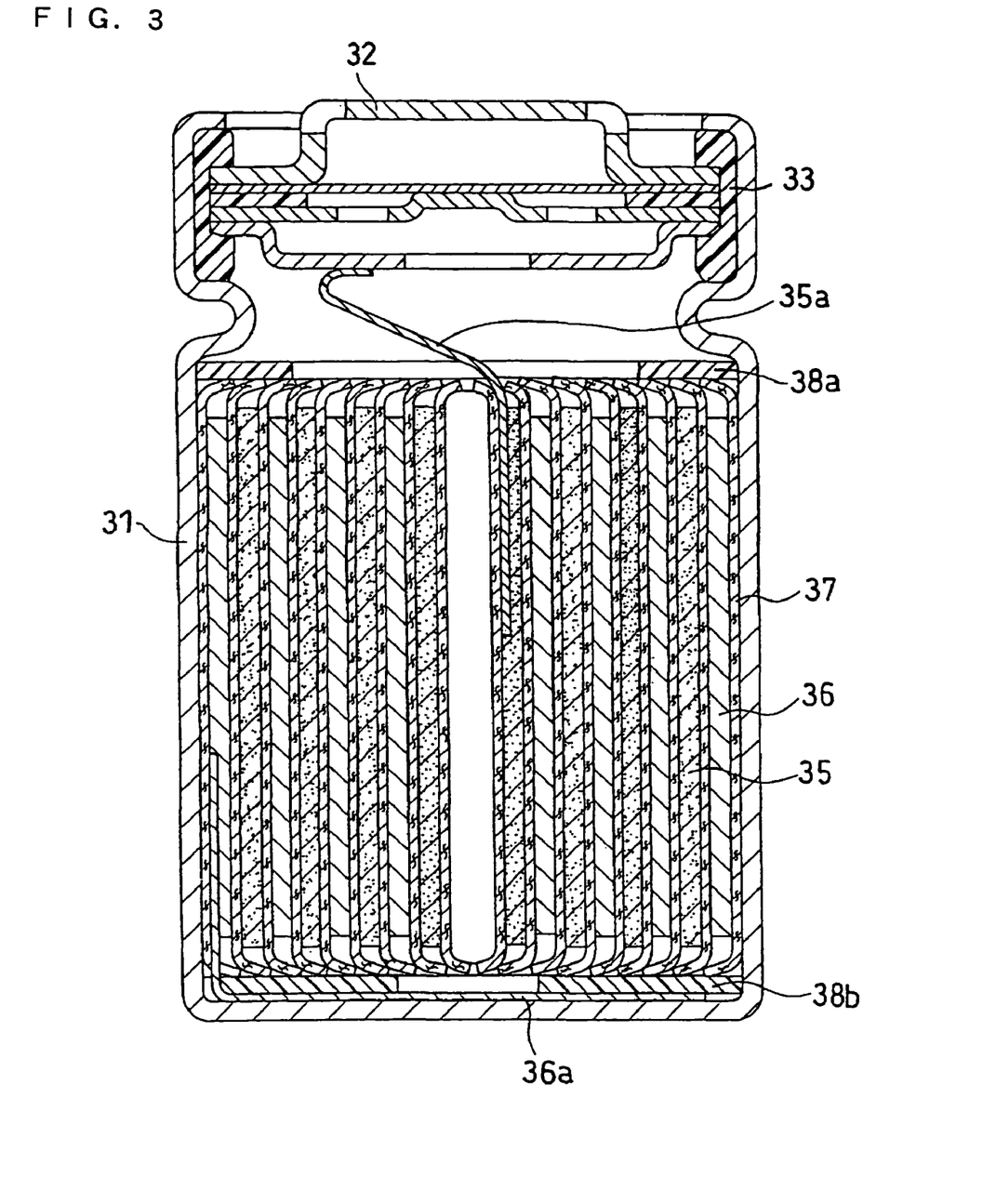
FIG. 3 A vertical cross sectional view of a lithium ion secondary battery of an embodiment of the present invention.

The outer face of the electrode plate assembly was wrapped by the separator 37. On top and bottom of the electrode plate assembly, an upper insulating ring 38a and a lower insulating ring 38b were disposed, respectively, and they were housed in an inner space of a battery can 31. Then, 5.5 g of the non-aqueous electrolyte was injected into the battery can 31, to impregnate the electrode plate assembly therewith. The other end of the positive electrode lead 35a was welded to a rear side of a sealing plate 32, to the periphery of which an insulating packing 33 was disposed. The other end of the negative electrode lead 36a was welded to an inner bottom face of the battery can 31. Lastly, an opening of the battery can 31 was closed with the sealing plate 32. A cylindrical-type 18650 lithium ion secondary battery (nominal capacity 2000 mAh) as shown in FIG. 3 was thus completed.

COMPARATIVE EXAMPLE 1

A lithium ion secondary battery was prepared in the same manner as Example 1, except that the porous electron-insulating layer was not carried on the positive electrode.

COMPARATIVE EXAMPLE 2

A lithium ion secondary battery was prepared in the same manner as Example 1, except that the porous electron-insulating layer was not carried on the positive electrode, but the raw material paint of the porous electron-insulating layer was applied on each side of the separator, and dried to form a porous electron-insulating layer with a thickness of 5 μm, respectively.

COMPARATIVE EXAMPLE 3

A lithium ion secondary battery was prepared in the same manner as Example 1, except that the porous electron-insulating layer was not carried on the positive electrode, but the raw material paint of the porous electron-insulating layer was applied on only the surface of the negative electrode material mixture layer on each side of the negative electrode, and dried to form a porous electron-insulating layer with a thickness of 5 μm, respectively.

EXAMPLE 2

A lithium ion secondary battery was prepared in the same manner as Example 1, except that the porous electron-insulating layer was not carried on the positive electrode, but the raw material paint of the porous electron-insulating layer was applied on the surface of the negative electrode material mixture layer and the current collecting portion excluding the region B on each side of the negative electrode, and dried to form a porous electron-insulating layer with a thickness of 5 μm, respectively.

EXAMPLE 3

A lithium ion secondary battery was prepared in the same manner as Example 2, except that the raw material paint of the porous electron-insulating layer was applied also on the region B and the negative electrode lead portion disposed in the region B, and dried to form a porous electron-insulating layer with a thickness of 5 μm.

EXAMPLE 4

A lithium ion secondary battery was prepared in the same manner as Example 2, except that in the preparation of the raw material paint of the porous electron-insulating layer, titania with a median diameter of 0.3 μm was used instead of the alumina with a median diameter of 0.3 μm, as the inorganic oxide filler.

COMPARATIVE EXAMPLE 4

A lithium ion secondary battery was prepared in the same manner as Example 2, except that in the preparation of the raw material paint of the porous electron-insulating layer, polyethylene beads with a median diameter of 0.3 μm was used instead of the inorganic oxide filler.

EXAMPLE 5

A lithium ion secondary battery was prepared in the same manner as Example 2, except that in the preparation of the raw material paint of the porous electron-insulating layer, polyvinylidene fluoride (PVDF) was used instead of BM-720H as the binder.

EXAMPLE 6

A lithium ion secondary battery was prepared in the same manner as Example 2, except that in the preparation of the raw material paint of the porous electron-insulating layer, BM-500B (an NMP solution including 8 wt % of rubber particles comprising a copolymer including an acrylonitrile unit and an acrylate unit) manufactured by Zeon Corporation was used instead of BM-720H as the binder.

The contents in the above Examples and Comparative Examples are summarized in Table 1.

TABLE 1

| | Porous Electron-Insulating Layer | | | | |
| | | | | Binder | |
| | Carrier | Filler | Kinds | Crystalline Melting Point (° C.) | Decomposition Temperature (° C.) |
|---|---|---|---|---|---|
| Ex. 1 | Positive electrode material mixture layer/ Current collecting portion | Alumina | BM-720H | None | 320 |
| Ex. 2 | Negative electrode material mixture layer/ Current collecting portion | Alumina | BM-720H | None | 320 |
| Ex. 3 | Negative electrode material mixture layer/ Current collecting portion/ Lead portion | Alumina | BM-720H | None | 320 |
| Ex. 4 | Negative electrode material mixture layer/ Current collecting portion | Titania | BM-720H | None | 320 |
| Ex. 5 | Negative electrode material mixture layer/ Current collecting | Alumina | PVDF | 174 | 360 |

TABLE 1-continued

| | Porous Electron-Insulating Layer | | | | |
|---|---|---|---|---|---|
| | | | Binder | | |
| | Carrier | Filler | Kinds | Crystalline Melting Point (° C.) | Decomposition Temperature (° C.) |
| Ex. 6 | Negative electrode material mixture layer/ Current collecting portion | Alumina | BM-500B | None | 320 |
| Comp. Ex. 1 | None | — | — | — | — |
| Comp. Ex. 2 | Separator | Alumina | BM-720H | None | 320 |
| Comp. Ex. 3 | Negative electrode material mixture layer | Alumina | BM-720H | None | 320 |
| Comp. Ex. 4 | Negative electrode material mixture layer/ Current collecting portion | Polyethylene Beads | BM-720H | None | 320 |

[Evaluation]

After carrying out a preliminary charge and discharge for batteries in each Example and in each Comparative Example, the evaluations below were carried out. The results are shown in Table 2.

(Nail Penetration Safety)

A nail penetration test was carried out in the following manner.

The following charge was carried out at first under an environment of 20° C. for each battery.
Constant Current Charge: 1400 mA
(End Voltage 4.25 V)
Constant Voltage Charge: 4.25 V
(End Current 100 mA)

Under an environment of 20° C., an iron-made round nail with a diameter of 2.7 mm was allowed to penetrate at a speed of 5 mm/sec or 180 mm/sec into the charged battery, from the side face of the battery. Status of the heat generation in the proximity of the short circuit point was observed after 1 second and 90 seconds.

(High-temperature Safety)

A high-temperature heat-resistance test was carried out in the following manner.

The following charge was carried out under an environment of 20° C. for each battery, first.
Constant Current Charge: 1400 mA
(End Voltage 4.25 V)
Constant Voltage Charge: 4.25 V
(End Current 100 mA)

The temperature of the charged battery was raised at the speed of 5° C./min until reaching 150° C., and left for 3 hours at 150° C. The highest temperature reached of the battery at that time was measured.

TABLE 2

| | Evaluation | | | | |
|---|---|---|---|---|---|
| | Nail Penetration Safety | | | | |
| | Nail Penetration Speed 5 mm/sec. Temperature Reached (° C.) | | Nail Penetration Speed 180 mm/sec. Temperature Reached (° C.) | | Safety at High-temperature Highest Temperature |
| | After 1 sec. | After 90 sec. | After 1 sec. | After 90 sec. | Reached (° C.) |
| Ex. 1 | 72 | 91 | 70 | 88 | 147 |
| Ex. 2 | 76 | 89 | 69 | 93 | 145 |
| Ex. 3 | 71 | 86 | 70 | 88 | 145 |
| Ex. 4 | 74 | 94 | 72 | 89 | 146 |
| Ex. 5 | 78 | 115 | 73 | 94 | 155 |
| Ex. 6 | 68 | 84 | 67 | 86 | 146 |
| Comp. Ex. 1 | 139 | — | 135 | — | 167 |
| Comp. Ex. 2 | 81 | 151 | 69 | 93 | 165 |
| Comp. Ex. 3 | 76 | 131 | 74 | 98 | 150 |
| Comp. Ex. 4 | 146 | — | 142 | — | 168 |

[Observations]

(i) Presence or Absence of Porous Electron-Insulating Layer

In Comparative Example 1 in which the porous electron-insulating layer does not exist, regardless of the nail penetration speed, the abnormal overheat after 1 second was notable. On the other hand, in Comparative Example 2 in which the porous electron-insulating layer was carried on the separator, although the overheat speed after the nail penetration decreased, the overheat was accelerated when the nail penetration speed was slow, failing to suppress the abnormal overheat in the end. On the other hand, in Examples 1 and 2, in which the porous electron-insulating layer was carried on the surface of the electrode material mixture layer and the current collecting portion, the overheat speed was significantly suppressed.

When the batteries after the nail penetration test were disassembled and inside of the battery was checked, although the separator was melted in a wide range in all of the batteries, in Examples 1 and 2, the porous electron-insulating layer kept its original shape. Therefore, it seems that the porous electron-insulating layer was not damaged at the time of heating due to the short circuit by the nail penetration, and the short circuit between the current collecting portion of one electrode and the material mixture layer of the other electrode was suppressed, thereby suppressing the heating and preventing the expansion of the short circuit portion and the abnormal overheat.

In the batteries of Comparative Example 2, the porous electron-insulating layer was deformed along with the melting of the separator. Additionally, in the high-temperature heat-resistance test, abnormal overheat due to the short circuit was confirmed. The porous electron-insulating layer maintains its plane-direction structure based on the carrier. Thus, even though the porous electron-insulating layer itself has a high heat-resistance, when the deformation is caused in the separator by shrinking or melting, it is inevitable for the porous electron-insulating layer to follow such deformation.

Herein, the nail penetration test is explained in detail.

Causes for the heat generation due to the nail penetration can be explained as in below, from the test results of the past. When the positive electrode and the negative electrode make contact (short circuit) by a nail penetration, the Joule heat is generated. The Joule heat melts materials with low heat resistance (separator), to form a strong short circuit portion. As a result, generation of the Joule heat continues, to raise the temperature of the positive electrode to the temperature range where the positive electrode becomes thermally unstable (165° C. or more). The abnormal overheat is thus caused.

Also, when the nail penetration speed is decreased, local acceleration of the heat generation can be observed. When the nail penetration speed was decreased to limit the short circuit area per unit time, substantial amount of heat concentrates on a limited portion, to probably speed up the temperature of the positive electrode to reach the thermally unstable range. On the other hand, when the short circuit area per unit time was expanded by increasing the nail penetration speed, heat spreads to a wider area, which probably prevents the positive electrode from reaching the temperature range where the positive electrode becomes thermally unstable.

In various applications, safety standard for the lithium ion secondary battery is becoming further and further strict, and regardless of the nail penetration speed (short circuit state), techniques to suppress the abnormal overheat are strongly desired. Examples 1 and 2 show that the present invention can satisfy such hard request.

(ii) Binder for Porous Electron-Insulating Layer

In Example 5, in which PVDF was used for the binder of the porous electron-insulating layer, the abnormal overheat was suppressed when the nail penetration speed was fast. However, compared with Examples 1, 2, and 6, in which an amorphous resin material including an acrylonitrile unit or an acrylate unit and having no crystalline melting point was used, a relatively sudden temperature increase was observed. Thus, the resin material to be used as a binder preferably includes an acrylonitrile unit, an acrylate unit, and/or a methacrylate unit.

The resin material including an acrylonitrile unit, an acrylate unit, and/or a methacrylate unit is highly flexible. Thus, in a battery including a wound type electrode plate assembly, such resin material is excellent also in view of decreasing defects due to cracks of the porous electron-insulating layer.

(iii) Kinds of Filler

In Example 4, in which titania was used instead of alumina, evaluation results almost the same as that of the alumina were confirmed. On the other hand, in Comparative Example 4 in which polyethylene beads (PE beads) were used, results for safety at the time of nail penetration were extremely poor. Since PE beads only have the same level of heat-resistance as the microporous film which is the separator, PE beads probably do not achieve functions of the porous electron-insulating layer to prevent a short circuit. Thus, it is essential to select an inorganic oxide as the filler.

INDUSTRIAL APPLICABILITY

The present invention provides a lithium ion secondary battery which is excellent in heat-resistance, and in which an internal short circuit and an abnormal overheat of the battery can be highly suppressed. The present invention is useful for a power source of portable devices, which requires a higher safety level.

The invention claimed is:

1. A lithium ion secondary battery, comprising: a pair of electrodes comprising a positive electrode and a negative electrode; a separator comprising a microporous film; and a non-aqueous electrolyte, wherein said positive electrode and said negative electrode are wound with said separator interposed therebetween, said positive electrode comprises: a positive electrode core material; and a positive electrode material mixture layer carried on said positive electrode core material, said positive electrode material mixture layer comprising a composite lithium oxide, said negative electrode comprises: a negative electrode core material; and a negative electrode material mixture layer carried on said negative electrode core material, said negative electrode material mixture layer comprising a negative electrode material capable of absorbing and desorbing lithium, in the case where the winding direction is in a longitudinal direction, said positive electrode is provided with a positive electrode current collector portion on one end thereof in said longitudinal direction, said positive electrode current collector portion being a protrusion of said positive electrode core material on which said positive electrode material mixture layer is not carried, a part of a positive electrode lead is welded to said positive electrode current collector portion, an entire surface of said positive electrode material mixture layer and a part of said positive electrode current collector portion are covered with a porous electron-insulating layer, and said porous electron-insulating layer contains 50 wt % or more of an inorganic oxide filler and below 50 wt % of a binder.

2. The lithium ion secondary battery in accordance with claim 1, wherein said positive electrode current collector portion has an exposed region not covered with said porous electron-insulating layer, and a part of said positive electrode lead is welded to said exposed region.

3. The lithium ion secondary battery in accordance with claim 1, wherein the thickness of said separator is 10 to 25 μm and the thickness of said porous electron-insulating layer is 2 to 10 μm.

4. The lithium ion secondary battery in accordance with claim 1, wherein said porous electron-insulating layer contains 90 wt % or more of an inorganic oxide filler and below 10 wt % of a binder.

5. The lithium ion secondary battery in accordance with claim 1, wherein said inorganic oxide filler is at least one selected from the group consisting of alumina, titania, zirconia, and magnesia.

6. The lithium ion secondary battery in accordance with claim 1, wherein said binder included in said porous electron-insulating layer comprises a resin material which either does not have a crystalline melting point, or has a crystalline melting point of 250° C. or more.

7. The lithium ion secondary battery in accordance with claim 1, wherein, in the case where the winding direction is in a longitudinal direction, said negative electrode is provided with a negative electrode current collector portion on one end thereof in said longitudinal direction, said negative electrode current collector portion being a protrusion of said negative electrode core material on which said negative electrode material mixture layer is not carried, a part of a negative electrode lead is welded to said negative electrode current collector portion, an entire surface of said negative electrode material mixture layer and a part of said negative electrode current collector portion are covered with a porous electron-insulating layer, and said porous electron-insulating layer contains 50 wt % or more of an inorganic oxide filler and below 50 wt % of a binder.

8. The lithium ion secondary battery in accordance with claim 7, wherein said negative electrode current collector portion has an exposed region not covered with said porous electron-insulating layer, and a part of said negative electrode lead is welded to said exposed region.

9. The lithium ion secondary battery in accordance with claim 7, wherein said positive electrode current collector portion and said negative electrode current collector portion are disposed on end portions, respectively, said end portions positioned at opposite sides of the winding direction which is in said longitudinal direction, respectively.

10. The lithium ion secondary battery in accordance with claim 7, wherein said porous electron-insulating layer contains 90 wt % or more of an inorganic oxide filler and below 10 wt % of a binder.

11. The lithium with claim 7, wherein said inorganic oxide filler is at least one selected from the group consisting of alumina, titania, zirconia, and magnesia.

12. A lithium ion secondary battery, comprising: a pair of electrodes comprising a positive electrode and a negative electrode; a separator comprising a microporous film; and a non-aqueous electrolyte,
wherein said positive electrode and said negative electrode are wound with said separator interposed therebetween,
said positive electrode comprises: a positive electrode core material; and a positive electrode material mixture layer carried on said positive electrode core material, said positive electrode material mixture layer comprising a composite lithium oxide,
said negative electrode comprises: a negative electrode core material; and a negative electrode material mixture layer carried on said negative electrode core material, said negative electrode material mixture layer comprising a negative electrode material capable of absorbing and desorbing lithium,
in the case where the winding direction is in a longitudinal direction, said negative electrode is provided with a negative electrode current collector portion on one end thereof in said longitudinal direction, said negative electrode current collector portion being a protrusion of said negative electrode core material on which said negative electrode material mixture layer is not carried,
a part of a negative electrode lead is welded to said negative electrode current collector portion,
an entire surface of said negative, electrode material mixture layer and a part of said negative electrode current collector portion are covered with a porous electron-insulating layer, and
said porous electron-insulating layer contains 50 wt % or more of an inorganic oxide filler and below 50 wt % of a binder.

13. The lithium ion secondary battery in accordance with claim 12, wherein said negative electrode current collector portion has an exposed region not covered with said porous electron-insulating layer, and a part of said negative electrode lead is welded to said exposed region.

14. The lithium ion secondary battery in accordance with claim 12, wherein the thickness of said separator is 10 to 25 μm and the thickness of said porous electron-insulating layer is 2 to 10 μm.

15. The lithium ion secondary battery in accordance with claim 12, wherein said porous electron-insulating layer contains 90 wt % or more of an inorganic oxide filler and below 10 wt % of a binder.

16. The lithium ion secondary battery in accordance with claim 12, wherein said inorganic oxide filler is at least one selected from the group consisting of alumina, titania, zirconia, and magnesia.

* * * * *